(12) United States Patent
McCormick et al.

(10) Patent No.: US 10,136,351 B2
(45) Date of Patent: Nov. 20, 2018

(54) MOBILE EDGE COMPUTING FOR TELE-OPERATION

(71) Applicants: William Carson McCormick, Ottawa (CA); Mehdi Arashmid Akhavain Mohammadi, Ottawa (CA)

(72) Inventors: William Carson McCormick, Ottawa (CA); Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 15/251,711

(22) Filed: Aug. 30, 2016

(65) Prior Publication Data

US 2018/0063740 A1 Mar. 1, 2018

(51) Int. Cl.
| | | |
|---|---|---|
| *H04M 3/00* | (2006.01) | |
| *H04W 28/02* | (2009.01) | |
| *G08C 17/02* | (2006.01) | |
| *H04W 76/15* | (2018.01) | |

(52) U.S. Cl.
CPC ........ *H04W 28/0215* (2013.01); *G08C 17/02* (2013.01); *H04W 28/0236* (2013.01); *H04W 76/15* (2018.02)

(58) Field of Classification Search
CPC ........... H04B 7/18506; H04B 7/18505; H04W 84/06; H04W 16/18; H04W 56/001; H04W 84/042; B64C 39/024; B64C 2201/127; B64C 2201/146; B64C 2201/027; B64C 2201/122; B64C 2201/123; B64C 2201/141

USPC ........... 455/422.1, 446, 39, 431, 450, 456.1
See application file for complete search history.

(56) References Cited

U.S. PATENT DOCUMENTS

| | | | |
|---|---|---|---|
| 2015/0230124 A1* | 8/2015 | Damola | H04W 4/00 370/235 |
| 2017/0019265 A1 | 1/2017 | Hou et al. | |
| 2017/0150373 A1* | 5/2017 | Brennan | H04W 16/28 |

OTHER PUBLICATIONS

International Search Report dated Nov. 10, 2017 for corresponding International Application No. PCT/CN2017/095469 filed Aug. 1, 2017.
Shi, Y., Software Architecture Analysis and Application of Fog Computing Platform, Sc.M. Dissertation of Zhejiang Normal University, May 26, 2016.
Hu et al., Mobile Edge Computing: A key technology towards 5G, ETSI White Paper No. 11, Sep. 30, 2015.
http://www.skydrone.aero/fpv/how-it-works-fpv, May 30, 2016.
"Mobile-Edge Computing Initiative"—Executive Briefing Issue 1, Mobile Edge Computing (MEC), Sep. 2014. (https://portal.etsi.org/portals/0/tbpages/mec/docs/mec%20exective%20brief%20v1%2028-09-14.pdf).

* cited by examiner

*Primary Examiner* — Fred A Casca

(57) ABSTRACT

An apparatus includes radio transceiver equipment configured to transmit and receive radio signals to and from mobile devices within a coverage area of a Radio Access Network. A Mobile Edge Computing server is integrated with the radio transceiver equipment. The Mobile Edge Computing server is configured to host at least one application instantiating a virtual Rendezvous Point operative to support a bidirectional data link between a predetermined pair of the mobile devices.

10 Claims, 8 Drawing Sheets

MOBILE EDGE COMPUTING FOR TELE-OPERATION

CROSS-REFERENCE TO RELATED APPLICATIONS

This is the first application filed in respect of the present invention.

TECHNICAL FIELD

The present disclosure relates to radio access networks, and in particular to Mobile Edge Computing for Tele-operation.

BACKGROUND

The term "Tele-operation" refers to the remote operation of a device or system. FIGS. 1 and 2 schematically illustrate typical systems for tele-operation of a remotely piloted vehicle (RPV), such as a so-called "drone". In the example of FIG. 1, a user-operated remote control unit 2 establishes and maintains a direct radio link 4 with the RPV 6. The user may input control commands to the remote control unit 2, which operates to transmit these commands to the RPV 6 via the radio link 4. A receiver unit (not shown) in the RPV 6 detects the transmitted commands, and supplies them to a local controller unit (not shown) configured to control the various functions of the RPV 6.

As is known in the art, the arrangement of FIG. 1 is typical of low-cost RPV systems of the type commonly sold to hobbyists. While these systems are very inexpensive, they suffer from limited range and (often) low bandwidth through the radio link 4. In addition, problems can arise in situations in which more than one RPV 6 is being operated at a given time, due to radio interference between the involved remote control units 2 and RPVs 6. This radio interference problem is compounded in cases where the radio link 4 is bi-directional so that an RPV 6 can transmit information (such as video images) to its remote control unit 2. The system of FIG. 2 attempts to overcome these limitations by using the Radio Access Network (RAN) 8 to provide the data link between the user and the RPV 6.

As may be seen in FIG. 2, the RAN 8 includes one or more radio transceiver sites 10, each of which incorporates an antenna array 12 and a base station 14. The RAN 8 is normally connected to a data transport network 16 (such as, for example, an Optical Transport Network (OTN)) via one or more gateway servers 18. In the arrangement of FIG. 2, the user may use an application installed on a mobile device 20 (such as a mobile phone, tablet computer or the like) to interact with the RAN 8 to establish a data link 22 between the mobile device 20 and the a transceiver (not shown) in the RPV 6. User input commands can thus be transmitted from the user's mobile device 20 to the RPV 6 via the datalink 22, and information (such as video images) may be transmitted from the RPV 6 back to the user's mobile device 20 for display and storage.

The data link 22 between the user's mobile device 20 and the transceiver of the RPV 6 is supported by a pair of respective connections 24, 26 established between each of the two devices and a Rendezvous Point (RP) 28, which is normally located in the data/transport network 16. The RP 28 can then operate to forward data traffic flows between the two connections, and thus between the two devices, and may also provide Network Address Translation (NAT) to allow the connections 24, 26 to traverse network domains as needed and firewall services to ensure the integrity of the connections.

The arrangement of FIG. 2 is advantageous in that the high bandwidth and strong interference management capabilities of the RAN 8 enable richer data exchange between the user's mobile device 20 and their RPV 6 while also allowing multiple RPV's to operate simultaneously. In addition, the range of the data link 22 between the user's mobile device 20 and their RPV 6 is limited only by the coverage area of the RAN 8. Both of these factors can improve the performance and safety of RPVs. However, this system suffers a limitation in that the extended connections 24 and 26 between the RP 28 and each of the user's mobile device 20 and their RPV 6 increases signal latency. In some cases, the latency can amount to as much as 20 mSec or more. This latency is a problem because it operates on both legs of the round-trip control loop between the 's mobile device 20 and their RPV 6 (i.e. a video image is transmitted from the RPV 6 to the user's mobile device 20; in response to the video image, the user inputs a control command into their mobile device 20 which transmits the command to the RPV 6, which detects and acts upon the command), such that the round trip control delay is increased by an amount approximately equal to double the signal latency. As will be appreciated, a round trip control delay of 40 mSec or more can detrimentally affect the user's ability to control their RPV 6 in a safe and effective manner.

Accordingly, it would be desirable to enable tele-operation in which the high bandwidth and interference management capabilities of the RAN are obtained, while minimizing signal latency.

SUMMARY

Accordingly, an aspect of the present invention provides an apparatus comprising: radio transceiver equipment configured to transmit and receive radio signals to and from mobile devices within a coverage area of a Radio Access Network; and a Mobile Edge Computing server integrated with the radio transceiver equipment, the Mobile Edge Computing server configured to host at least one application instantiating a virtual Rendezvous Point operative to forward traffic flows associated with a bidirectional data link between a predetermined pair of the mobile devices.

A further aspect of the present invention provides a method of transmitting and receiving radio signals to and from mobile devices within a coverage area of radio transceiver equipment of a Radio Access Network, the method comprising: receiving, by a Mobile Edge Computing server, a request from a mobile device, the Mobile Edge Computing server integrated with the radio transceiver equipment; creating, by the Mobile Edge Computing server, a tele-operation session based on the received request; and instantiating, by the Mobile Edge Computing server, a virtual Rendezvous Point associated with the tele-operation session, the virtual Rendezvous Point operative to transmit and receive radio signals associated with the tele-operation session to and from a predetermined pair of mobile devices.

A further aspect of the present invention provides a non-transitory computer readable medium comprising machine readable instructions configured to control a Mobile Edge Computing server integrated with radio transceiver equipment configured to transmit and receive radio signals to and from mobile devices within a coverage area of a Radio Access Network, the machine readable instructions comprising machine readable instructions controlling the Mobile Edge Computing server to host at least one application instantiating a virtual Rendezvous Point operative to forward traffic flows associated with a bidirectional data link between a predetermined pair of the mobile devices.

An advantage of the present invention is that by integrating the Mobile Edge Computing server with radio transceiver equipment of the Radio Access Network, the Rendezvous point is located at the network edge, which minimizes the distance between the users' mobile devices and the Rendezvous Point, and thereby minimizes signal latency.

BRIEF DESCRIPTION OF THE DRAWINGS

Features and advantages of the present invention will become apparent from the following detailed description, taken in combination with the appended drawings, in which.

It will be noted that throughout the drawings, like elements are identified by like reference numerals.

DETAILED DESCRIPTION

Mobile-Edge Computing (MEC) has been proposed as an architecture for providing Information Technology (IT) and cloud-computing capabilities within a Radio Access Network (RAN) in close proximity to mobile subscribers. The MEC architecture is based on the use of a MEC server which can be deployed at a Long-Term Evolution (LTE) macro base station (eNB) site, or at a 3G Radio Network Controller (RNC) site, or alternatively at a multi-technology (3G/LTE) cell aggregation site. When the MEC server is deployed at an eNB or RNC, it can provide locally-relevant computing services to subscribers within the coverage area of that eNB or RNC. On the other hand, a multi-technology (LTE/3G) cell aggregation site can be located within an enterprise (e.g. hospital, office building, stadium, shopping mall etc) to control a number of local multi-technology (3G/LTE) access points providing radio coverage to the premises. Deployment of a MEC server at the cell aggregation site enables the direct delivery of locally-relevant computing services within the coverage area of a base station cluster.

Mobile-Edge Computing is designed to provide a highly distributed computing environment that can be used to deploy applications and services as well as to store and process content in close proximity to mobile users. Applications may also access real-time radio and network information, as well as context-relevant content from a data network (such as the internet, for example) and so may offer a personalized and contextualized experience to the mobile subscriber. This translates into a mobile-broadband experience that may be more responsive to subscriber needs, as compared to conventional Radio Access Network techniques.

Mobile-Edge Computing is implemented by means of a Mobile-Edge Computing (MEC) server which is preferably integrated with the base station equipment that controls signalling within a given coverage area of the RAN. The MEC server provides computing resources, storage capacity, connectivity, and access to user traffic and radio and network information.

Figure 1:
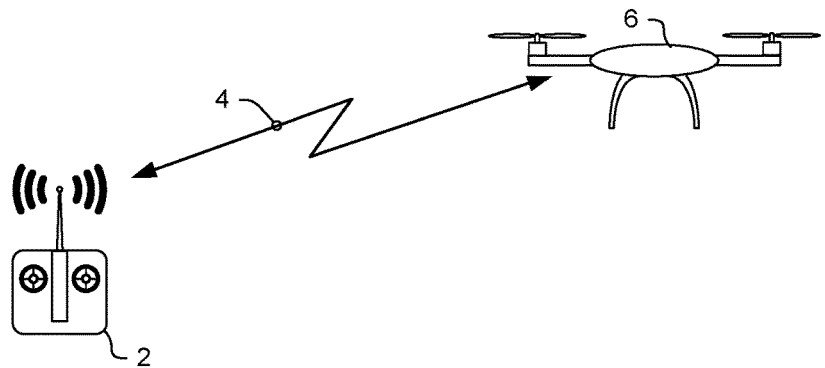
FIG. 1 is a block diagram schematically illustrating a prior art tele-operation scenario using a direct radio link.
Figure 2:
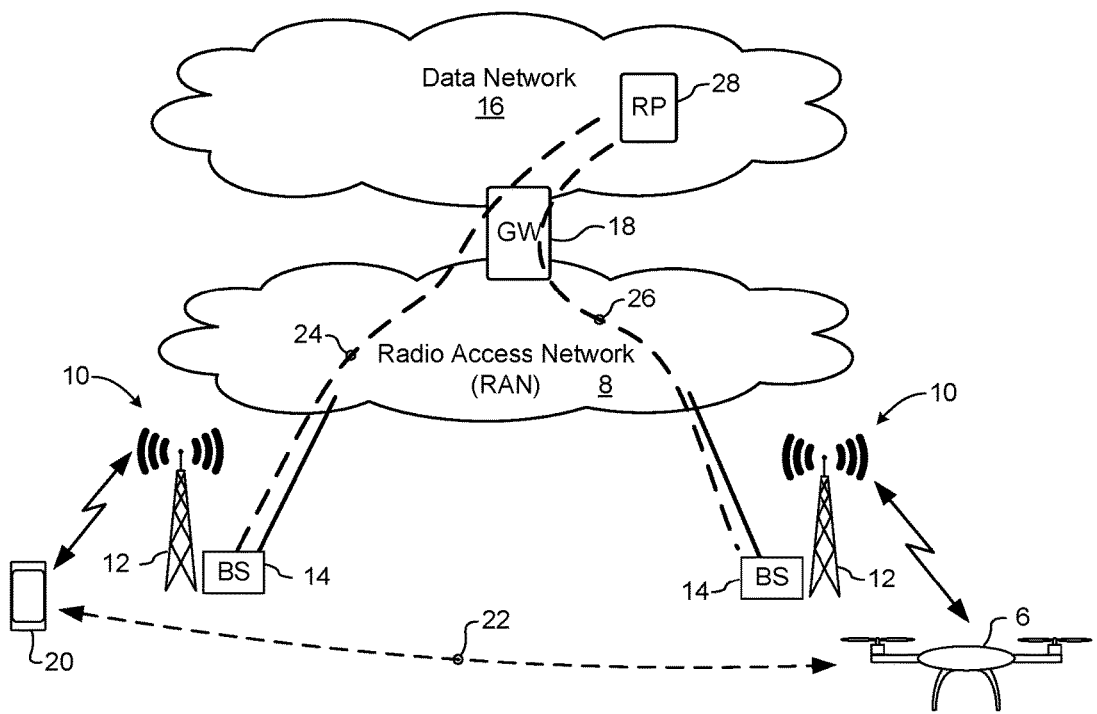
FIG. 2 is a block diagram schematically illustrating a prior art tele-operation scenario using a Radio Access Network (RAN)
Figure 3:
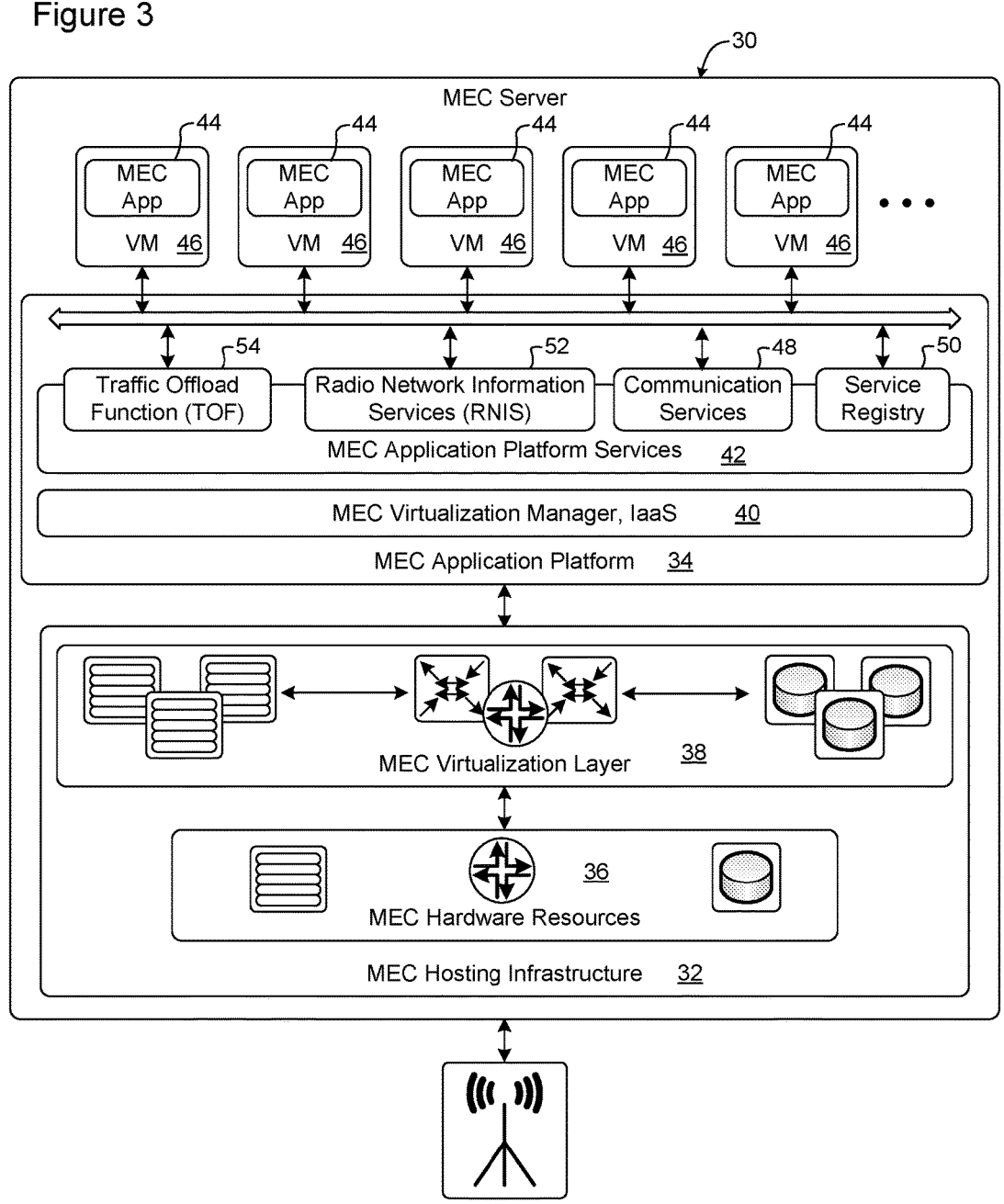
FIG. 3 is a block diagram schematically illustrating a representative architecture of a Mobile Edge Computing (MEC) server usable in embodiments of the present invention.

FIG. 3 is a block diagram schematically illustrating an architecture of a representative MEC server 30 usable in embodiments of the present invention. It is contemplated that the MEC server 30 may be physically implemented as one or more computers, storage devices and routers interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical MEC server hardware is not included in this specification. Rather, the block diagram of FIG. 3 shows a representative functional architecture of a MEC server 30, it being understood that this functional architecture may be implemented using any suitable combination of hardware and software.

As maybe seen in FIG. 3, the illustrated MEC server 30 generally comprises a MEC hosting infrastructure 32 and a MEC application platform 34. The MEC hosting infrastructure 32 comprises the physical hardware resources 36 (such as, for example, information processing, traffic forwarding and data storage resources) of the MEC server 30, and a virtualization layer 38 that presents an abstraction of the hardware resources 36 to the MEC Application Platform 34. The specific details of this abstraction will depend on the requirements of the applications being hosted by the MEC Application layer (described below). Thus for example, an application that provides traffic forwarding functions may be presented with an abstraction of the MEC hardware resources 36 that simplifies the implementation of traffic forwarding policies in one or more routers. Similarly, an application that provides data storage functions may be presented with an abstraction of the MEC hardware resources 36 that facilitates the storage and retrieval of data (for example using Lightweight Directory Access Protocol—LDAP).

The MEC application platform 34 provides the capabilities for hosting applications and includes a virtualization manager 40 and application platform services 42. The virtualization manager 40 supports a flexible and efficient multi-tenancy run-time and hosting environment for applications 44 by providing Infrastructure as a Service (IaaS) facilities. In operation, the virtualization manager 40 may provide a security and resource "sandbox" for each application being hosted by the platform 34. Each "sandbox" may be implemented as a Virtual Machine (VM) image 46 that may include an appropriate operating system and controlled access to (virtualized) hardware resources 36 of the MEC server 30. The MEC application-platform services 42 provide a set of middleware application services and infrastructure services to the applications 44 hosted on the MEC application platform 34, as will be described in greater detail below.

MEC applications 44 from vendors, service providers, and third-parties may be deployed and executed within a respective Virtual Machine 46. Communication between applications 44 and services in the MEC server 30 may conveniently be designed according to the principles of Service-Oriented Architecture (SOA) known in the art.

Communication services 48 may allow applications 44 hosted on a single MEC server 30 to communicate with the application-platform services 42 (through pre-defined Application Programming Interfaces (APIs) for example) and with each other (for example through a service-specific API).

A Service registry 50 may provide visibility of the services available on the MEC server 30. In addition, the service registry 50 may present service availability (e.g. status of the service) together with the related interfaces and versions. This may be used by applications 44 to discover and locate the end-points for the services they require, and to publish their own service end-point for other applications to use.

Mobile-edge Computing allows cloud application services to be hosted alongside mobile network elements, and also facilitates leveraging of the available real-time network and radio information. MEC Radio Network Information Services (RNIS) 52 may provide applications 44 with low-level radio and network information. For example, the information provided by RNIS 52 may be used by an application 44 to calculate and present high-level and meaningful data such as: cell-ID, location of the subscriber, cell load and throughput guidance.

A Traffic Off-Load Function (TOF) 54 service may prioritize traffic, and route selected, policy-based, user-data streams to and from applications 44. The TOF service 54 may be supplied to applications 54 in the various ways, including: A Pass-through mode where (uplink and/or downlink) traffic is passed to an application 44 which can monitor, modify or shape it and then send it back to the original Packet Data Network (PDN) connection (e.g. 3GPP bearer); and an End-point mode where the traffic is terminated by the application 44 which acts as a server.

FIGS. 4A-4E are block diagrams schematically illustrating respective different possible deployment scenarios for implementing MEC in a Radio Access Network (RAN). It will be appreciated that multiple different deployment options can be simultaneously accommodated within a given Radio Access Network (RAN).

Figure 4A:
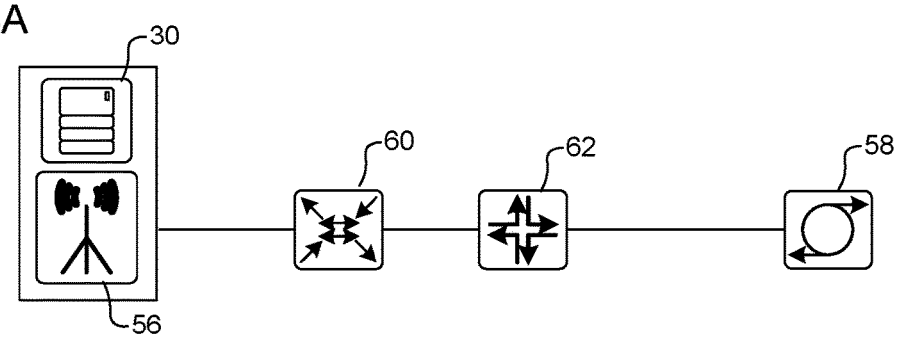
FIGS. 4A-4E are block diagrams schematically illustrating respective different scenarios for deploying a MEC server in a RAN, in accordance with example embodiments of the present invention.

FIG. 4A illustrates a scenario in which a MEC server 30 is integrated with an LTE macro base station (eNB) 56 and so can provide mobile edge computing services for subscribers via the LTE macro base station (eNB) 56 radio equipment, as well as connectivity to core network services 58 via any intervening switches 60 and routers 62.

Figure 4B:
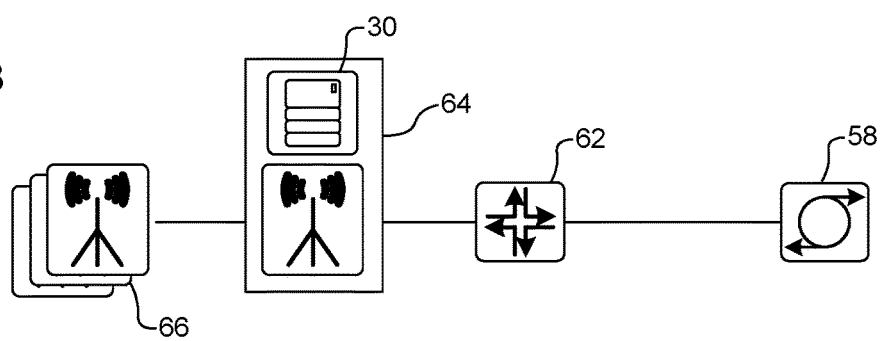
Figure 4C:
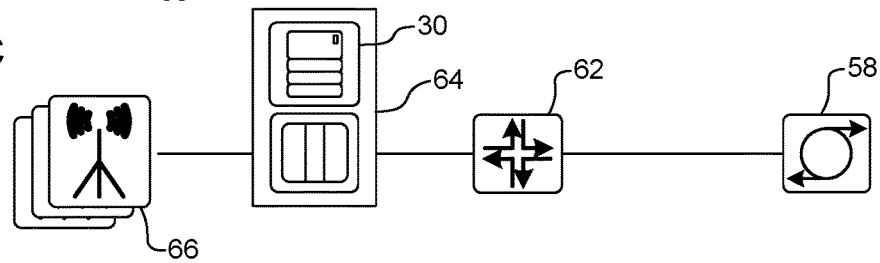
Figure 4D:
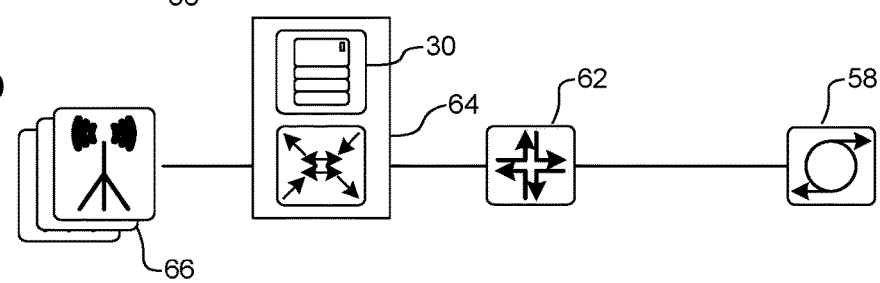

FIGS. 4B-4D illustrate respective scenarios in which the MEC server 30 is integrated with a multi-technology (3G/LTE) cell aggregation site 64, and so can provide mobile edge computing services for subscribers via the radio equipment 66 associated with the cell aggregation site 64, as well as connectivity to core network services 58 via any associated routers 62. FIG. 4B illustrates a specific embodiment in which the MEC server 30 is integrated with an eNB component of the cell aggregation site 64. FIG. 4C illustrates a specific embodiment in which the MEC server 30 is integrated with a Radio Network Controller (RNC) component of the cell aggregation site 64. FIG. 4D illustrates a specific embodiment in which the MEC server 30 is integrated with a switch component of the cell aggregation site 64. The specific embodiment of FIG. 4B may provide mobile edge computing services for subscribers via the radio equipment of the eNB site directly, as well as via downstream radio equipment 66 via the RNC and switching components of the cell aggregation site 64. The specific embodiments of FIGS. 4C and 4D may provide mobile edge computing services for subscribers via the downstream radio equipment 66 associated with the cell aggregation site 64.

Figure 4E:
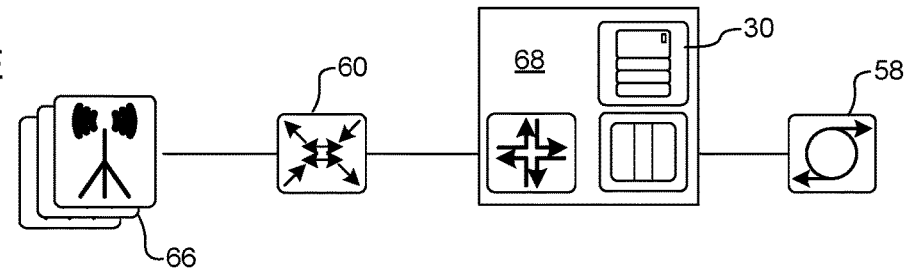

FIG. 4E illustrates a scenario in which the MEC server 30 is integrated with a Radio Network Controller (RNC) site 68, which operates to control a plurality of Universal Mobile Telecommunications System (UMTS) Node B base stations. As is known in the art, the Radio Network Controller (RNC) carries out radio resource management, some of the mobility management functions and is the point where encryption is done before user data is sent to and from mobile devices. With this arrangement, the MEC server 30 can provide mobile edge computing services for subscribers via the radio equipment 66 associated with the RNC site 68, as well as connectivity to core network services 58.

Figure 5:
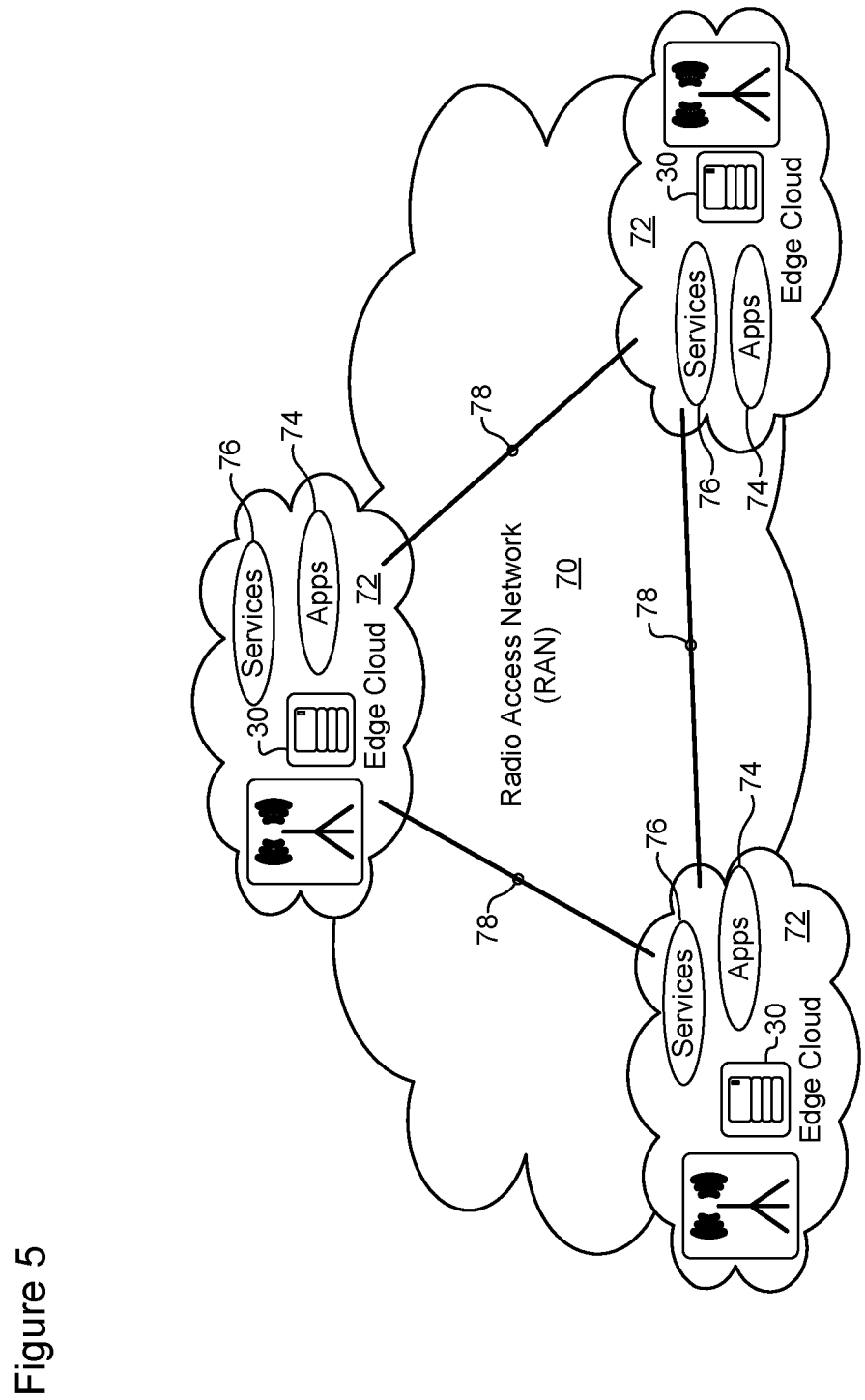
FIG. 5 is a block diagram schematically illustrating a representative RAN including edge cloud computing environments.

As may be appreciated, the above-described architecture of the MEC server 30, and its integration with the Radio Access Network (RAN) enables the provision of cloud computing services at the edge of the Radio Access Network. FIG. 5 is a block diagram schematically illustrating a representative RAN 70 in which this capability is used to provide edge cloud computing environments 72 within the RAN 70. As may be seen in FIG. 5, each edge cloud 72 comprises a MEC server 30 executing applications 74 that provide Services 76 to subscribers, as described above.

If desired, two or more edge clouds 72 may be linked by high-bandwidth inter-cloud trunks 78 (such as, for example, Traffic Engineered Label Switched Paths) that are set-up within the Radio Access Network 70, in advance, so as to provide a convenient mechanism for routing traffic between the edge clouds 72 with minimum latency.

Figure 6:
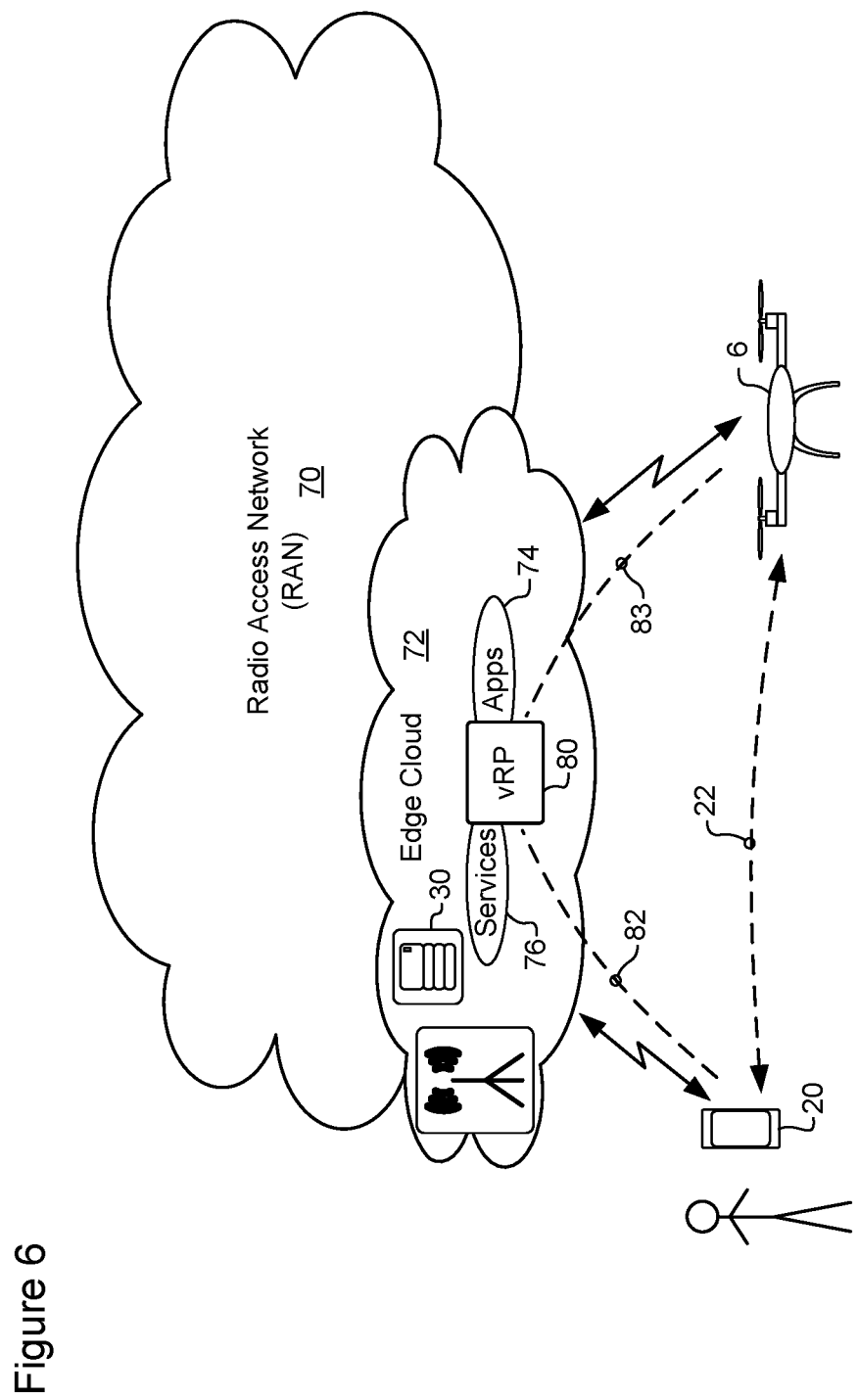
FIG. 6 is is a block diagram schematically illustrating a tele-operation scenario in accordance with a first example embodiment of the present invention.
Figure 7:
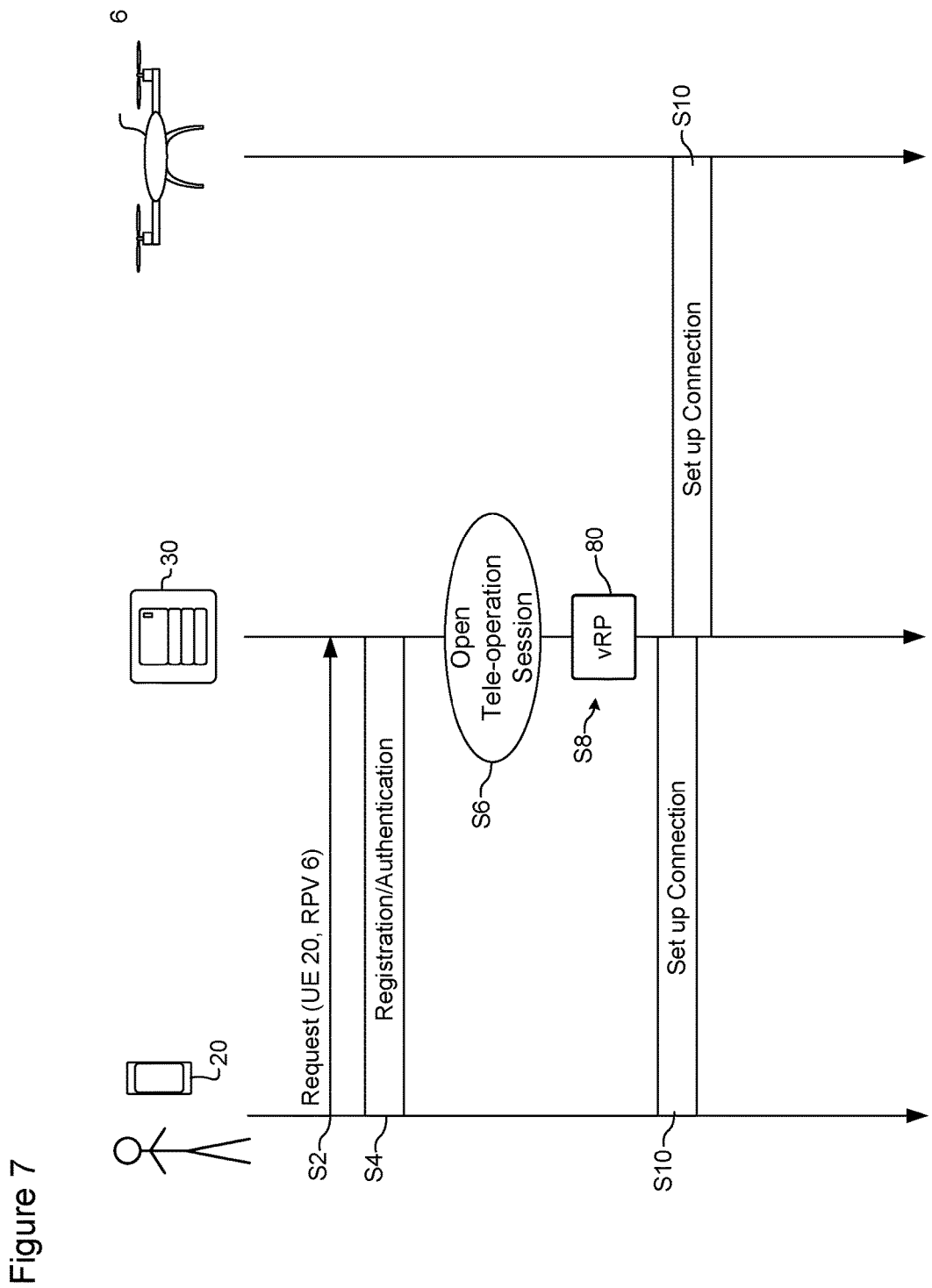
FIG. 7 is is a signal flow diagram schematically illustrating a representative process for setting up a tele-operation session in the example embodiment of FIG. 6.

FIGS. 6 and 7 schematically illustrate a first embodiment of tele-operation using the MEC implementation of FIGS. 3-5. In this embodiment, the user's mobile device 20 and their RPV 6 are located within a single edge cloud 72. In order to host the tele-operation session, the MEC server 30 instantiates one or more applications 74 implementing a virtual Rendezvous Point (vRP) 80 for the tele-operation session.

In an example embodiment, the MEC 30 may operate to offer a tele-operation service to subscribers. The user's mobile device 20 may therefore send a request message (FIG. 7 at S2) to the MEC 30 to set up a tele-operation session between the user's mobile device 20 and the user's RPV 6. For this purpose, an address or other suitable identifier of the user's RPV 6 may be included in the request message. In response to the request message, the MEC 30 may trigger a registration and/or authentication protocol (FIG. 7 at S4) to obtain the user's credentials and validate the user's authorization to use the tele-operation service. Upon successful completion of the registration/authentication protocol, the MEC may create the tele-operation session (FIG. 7 at S6), and instantiate the vRP 80 (FIG. 7 at S8) for that session. The vRP 80 may operate in a known manner to set up bi-directional connections 82 and 83 (FIG. 7 at S10 and S12) between itself and each of the user's mobile device 20 and their RPV 6, based on information obtained from the request message and/or during the registration/authentication process. Thereafter, the vRP manages traffic forwarding associated with the tele-operation session between these two bi-directional connections 82, and therefore between the two devices. By this means, high-bandwidth and low-latency bi-directional traffic flows between the user's mobile device 20 and their RPV 6 can be supported without occupying networking resources outside of the edge cloud 72. In this scenario, signal latency through the virtual Rendezvous Point (vRP) 80 can be as low as 1 mSec or less. If desired, the MEC server 30 may provide additional context and/or location-relevant information to the user (via their mobile device 20) as described above. It is contemplated that the MEC server 30 may also provide session information to a service provider to facilitate billing of the user, for example.

If desired, the vRP 80 may be instantiated in advance, and may thus be used to handle multiple tele-operation sessions. In such an embodiment, the vRP 80 may be referred to as "static" or "persistent", because it exists independently of any given tele-operation session. In such embodiments, a user would merely need to register with the vRP 80 to trigger set-up of the connections 82 and the bi-directional data link 22.

In other embodiments, the vRP 80 may be dynamically instantiated as part of the set-up of a tele-operation session, and may provide services solely to that session. In such an embodiment, the vRP 80 may be referred to as "dynamic", because it dynamically instantiated at the start of a tele-operation session, and is de-instantiated at the close of that session. In such embodiments, a user would interact with the MEC server 30 to open a tele-operation session, which would automatically trigger instantiation of the dynamic vRP 80 and the set-up of the connections 82 and the bi-directional data link 22.

Figure 8:
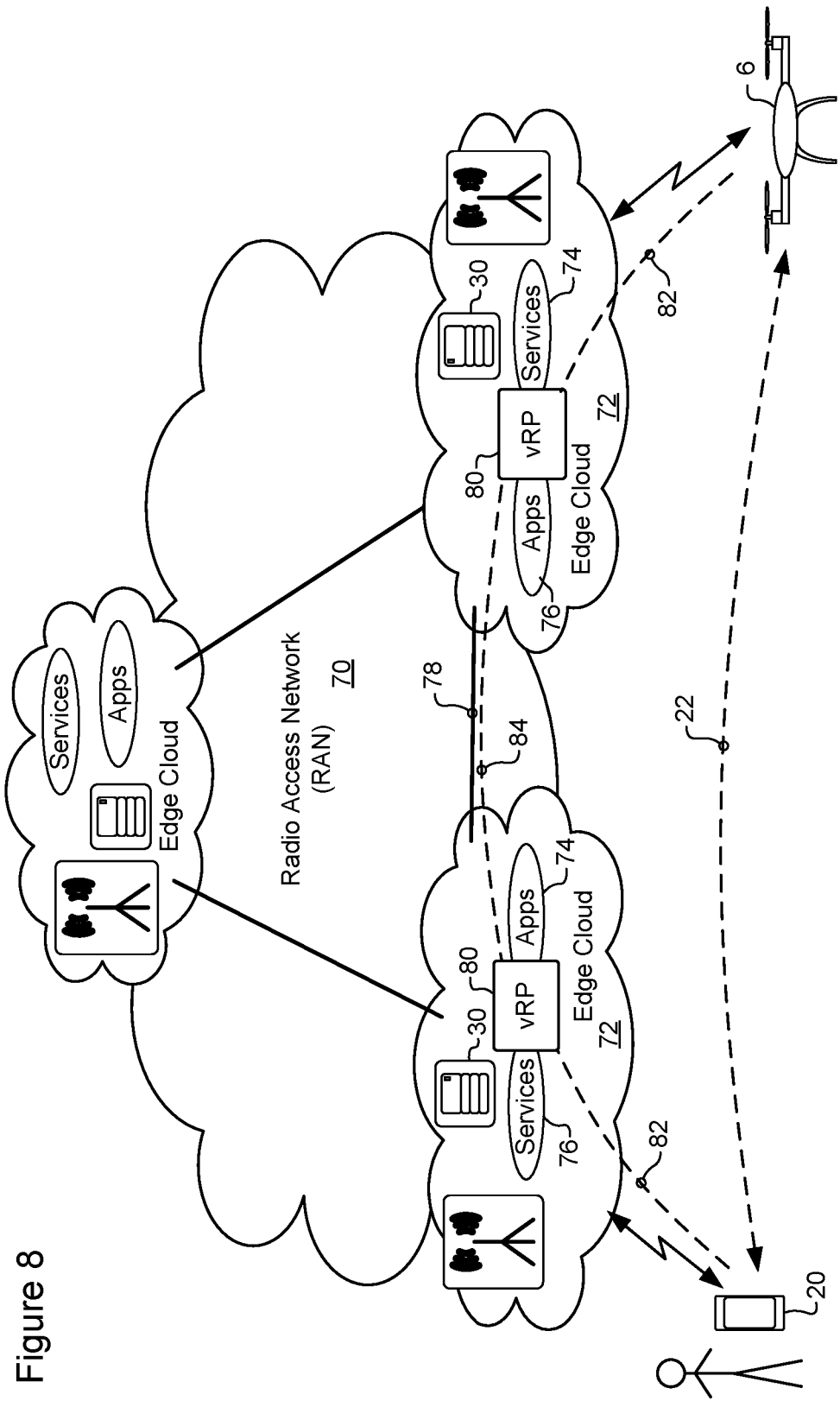
FIG. 8 is is a block diagram schematically illustrating a tele-operation scenario in accordance with a second example embodiment of the present invention.

FIG. 8 is a block diagram schematically illustrating a second embodiment of tele-operation using the MEC implementation of FIG. 4. In this embodiment, the user's mobile device 20 and their RPV 6 are located in respective different edge clouds 72. In this scenario, virtual Rendezvous Points (vRPs) 80 are instantiated (either statically or dynamically, as described above) in each of the edge clouds 72, and linked together by a virtual channel 84 mapped through the inter-cloud trunk 78. Bi-directional connections 82 between each of the user's mobile device 20 and their RPV 6 and their respective host vRPs 80 complete the end-to-end connection path, and supports the data link 22 between the mobile device 20 and the RPV 6. With this arrangement, high-bandwidth bidirectional data flows between the user's mobile device 20 and their RPV 6 can be supported through the RAN 70. In addition, the location of the vRP 80 instance(s) within the edge clouds 72 minimizes latency by avoiding utilization of transport capacity outside the RAN 70. In some cases, it is possible to obtain signal latency through the virtual RP(s) can be as low as 1 mSec or less.

Figure 9:
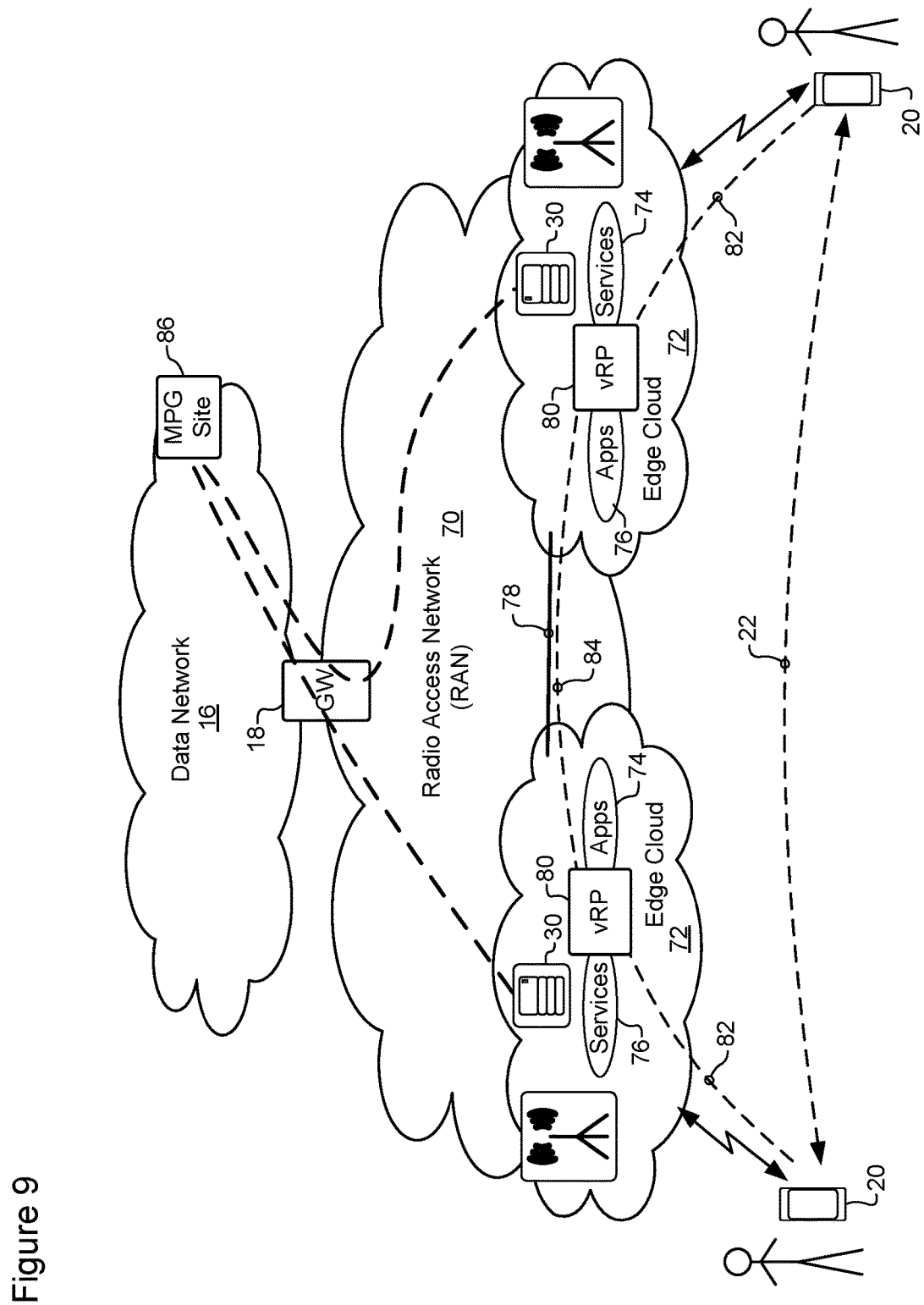
FIG. 9 is is a block diagram schematically illustrating a tele-operation scenario in accordance with a third example embodiment of the present invention.

As described above, FIGS. 6 and 7 illustrate embodiments of tele-operation in which a datalink 22 is hosted by one or more edge clouds 72 to enable bi-directional data flows between a user's mobile device 20 and a Remotely Piloted Vehicle (RPV) 6 such as a so-called "drone". It will be appreciated, however, that he present invention is not limited to such embodiments. In more general terms, the techniques described above may be equally applied to scenarios in which a user wishes to use a local device (of any description) exchange data with a remote device (of any description). The only limitations are that both the local device and the remote device must be located within the coverage area of the RAN, and include suitable transceivers and software configured to connect with an edge cloud and use its tele-operation services to set up and use the datalink 22 between the local and remote devices. FIG. 9 illustrates such an example, in which the tele-operation services offered by MEC in accordance with the present invention are used to host a bi-directional data link 22 between two mobile devices 20, which may, for example, be mobile phones, Personal Data Assistants, lap-top or tablet computers, or the like. An arrangement of this type may be used to support two-way video between the two mobile devices 20 with significantly reduced latency and improved bandwidth as compared to conventional video chat or so-called "live streaming" services. Furthermore, this capability can be extended by using the ability of the MEC servers 30 to access context-appropriate information content from the data network 16. For example, the arrangement of FIG. 9 may be used to enable two users to interact with each other (via the data link 22) and (via the MEC servers 30) with a multiplayer game hosted by a multiplayer game (MPG) site 86 in the data network 16.

The embodiments of the invention described above are intended to be representative only. The scope of the invention is therefore intended to be limited solely by the scope of the appended claims.

We claim:

1. An apparatus comprising:
radio transceiver equipment configured to transmit and receive radio signals to and from mobile devices within a coverage area of a Radio Access Network; and
a Mobile Edge Computing server integrated with the radio transceiver equipment, the Mobile Edge Computing server configured to host at least one application instantiating a virtual Rendezvous Point operative to forward traffic flows associated with a bidirectional data link between a predetermined pair of the mobile devices;
wherein the predetermined pair of mobile devices comprises:
a local device configured to interact with the virtual Rendezvous Point instantiated by at least one application hosted by the Mobile Edge Computing server; and
a remote device configured to interact with a second virtual Rendezvous Point instantiated by at least one application hosted by a second Mobile Edge Computing server; and
wherein the Mobile Edge Computing server is further configured to establish a virtual channel between the first and second virtual Rendezvous Points, the virtual channel being configured to convey signals associated with the bidirectional data link between the local and remote devices.

2. The apparatus as claimed in claim 1, wherein the radio transceiver equipment comprises a Long Term Evolution macro base station, and wherein the Mobile Edge Computing server is integrated with the Long Term Evolution macro base station.

3. The apparatus as claimed in claim 1, wherein the radio transceiver equipment comprises a 3G Radio Network Controller, and wherein the Mobile Edge Computing server is integrated with the Radio Network Controller.

4. The apparatus as claimed in claim 1, wherein the local device is configured to execute an App operative to interact with the Mobile Edge Computing server to set up the bidirectional data link.

5. The apparatus as claimed in claim 4, wherein the local device comprises any one or more of: a mobile phone, a Personal Data Assistant, a lap-top computer, a tablet computer.

6. The apparatus as claimed in claim 4, wherein the remote device comprises a transceiver configured to interact with the Mobile Edge Computing server to use the bidirectional data link with the local device.

7. The apparatus as claimed in claim 6, wherein the remote device comprises a remotely piloted vehicle.

8. The apparatus as claimed in claim 1, wherein the Mobile Edge Computing server is further configured to support an inter-cloud trunk through the Radio Access Network to the second Mobile Edge Computing server, and wherein the virtual channel is mapped through the inter-cloud trunk.

9. The apparatus as claimed in claim 1, wherein the radio transceiver equipment comprises a multi-technology cell aggregation site, and wherein the Mobile Edge Computing server is integrated with the multi-technology cell aggregation site.

10. A non-transitory computer readable medium comprising machine readable instructions configured to control a Mobile Edge Computing server integrated with radio transceiver equipment configured to transmit and receive radio signals to and from mobile devices within a coverage area of a Radio Access Network, the machine readable instructions comprising:

machine readable instructions controlling the Mobile Edge Computing server to host at least one application instantiating a virtual Rendezvous Point operative to forward traffic flows associated with a bidirectional data link between a predetermined pair of the mobile devices including:

a local device configured to interact with the virtual Rendezvous Point instantiated by at least one application hosted by the Mobile Edge Computing server; and a remote device configured to interact with a second virtual Rendezvous Point instantiated by at least one application hosted by a second Mobile Edge Computing server; and machine readable instructions controlling the Mobile Edge Computing server to establish a virtual channel between the first and second virtual Rendezvous Points, the virtual channel being configured to convey signals associated with the bidirectional data link between the local and remote devices.

* * * * *